Figure 1:
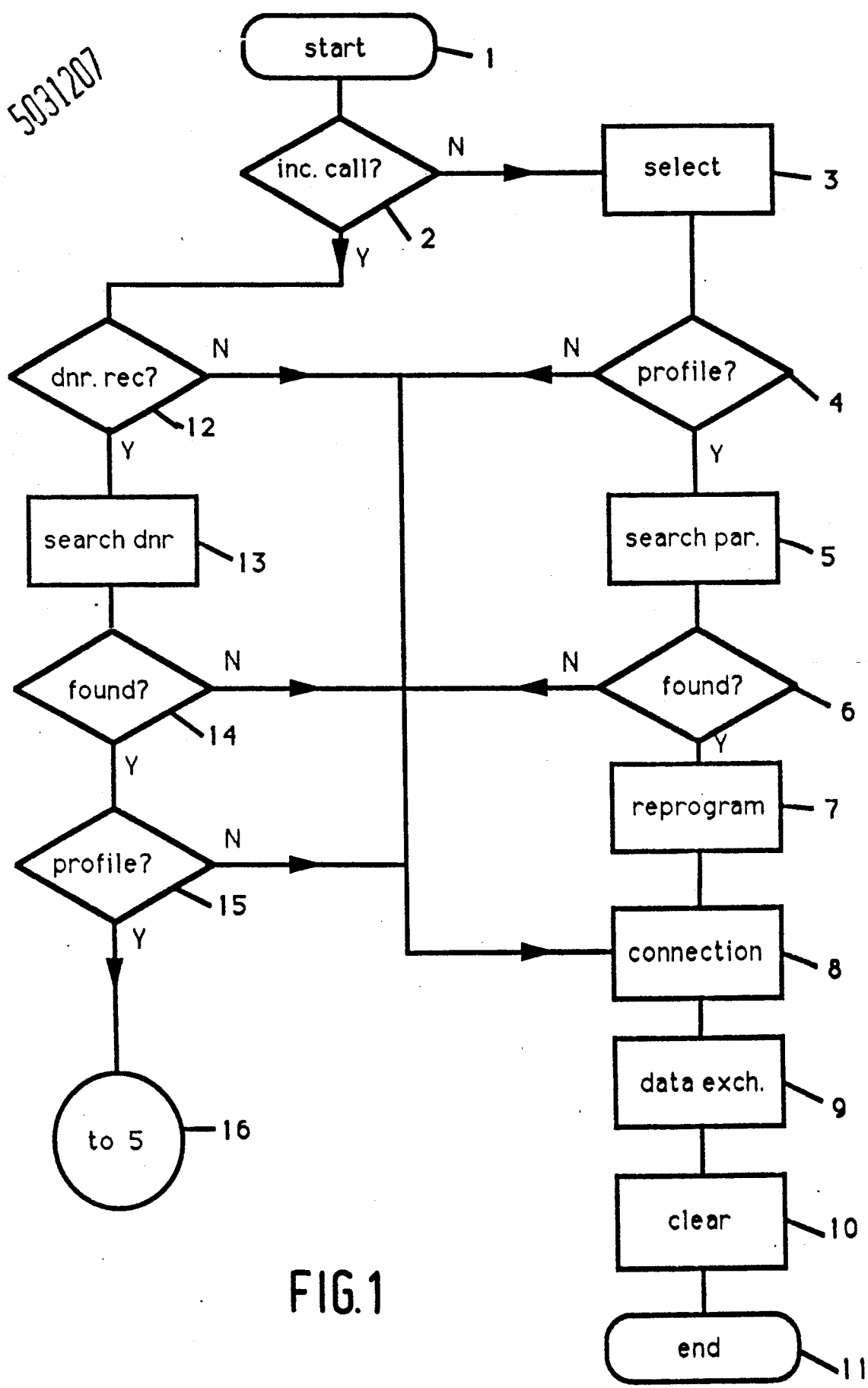

United States Patent [19]

Hesdahl et al.

[11] Patent Number: 5,031,207
[45] Date of Patent: Jul. 9, 1991

[54] METHOD OF ESTABLISHING A DATA LINK BETWEEN A PAIR OF TERMINALS AS WELL AS A TERMINAL WHICH IS SUITABLE FOR IMPLEMENTING THIS METHOD

[75] Inventors: Piet B. Hesdahl; Cornelis M. Klik; Sijtze Van Der Velde; Gijsbertus M. Besselsen, all of Hilversum, Netherlands

[73] Assignee: U.S. Philips Corporation, New York, N.Y.

[21] Appl. No.: 452,904

[22] Filed: Dec. 19, 1989

[30] Foreign Application Priority Data

Dec. 19, 1988 [NL] Netherlands ............. 8803102

[51] Int. Cl.5 .................................. H04M 11/00
[52] U.S. Cl. ............................ 379/93; 370/110.1
[58] Field of Search ............. 370/94.1, 94.2, 94.3, 370/79, 101.1; 379/93, 94, 96

[56] References Cited

U.S. PATENT DOCUMENTS

| | | | |
|---|---|---|---|
| 4,688,170 | 8/1987 | Waite et al. | 379/93 |
| 4,748,618 | 5/1988 | Brown et al. | 370/94.1 |
| 4,817,130 | 3/1989 | Frimmel, Jr. | 379/216 |
| 4,882,727 | 11/1989 | Williams et al. | 370/110.1 |
| 5,496,943 | 1/1985 | Greenblatt | 340/711 |

OTHER PUBLICATIONS

"Voice and Data Workstation and Services in the ISDN", Ericsson Review No. ISDN, 1984 pp. 14–19.

Primary Examiner—Jin F. Ng
Assistant Examiner—Ahmad F. Matar
Attorney, Agent, or Firm—Anne E. Barschall

[57] ABSTRACT

A method of establishing a data link between a first terminal, which is capable of communicating in accordance with a number of different data communication standards, and a plurality of further terminals which are each capable of communicating in accordance with a single data communication standard, whilst indicators (profile indicators) are extended to the dial numbers of the further terminals in the first terminal these indicators showing according to which data communication standard a specific further terminal is operating. If such an indicator is found with the telephone number when a link to a further terminal is established, the first terminal is automatically reprogrammed for subsequent operation in accordance with the data communication standard of the further terminal. The method can also be implemented when a terminal which is capable of communicating in accordance with a single data communication standard calls the first terminal, provided that the calling terminal transmits its call accompanied by its telephone number. Also a terminal for implementing the method.

10 Claims, 2 Drawing Sheets

METHOD OF ESTABLISHING A DATA LINK BETWEEN A PAIR OF TERMINALS AS WELL AS A TERMINAL WHICH IS SUITABLE FOR IMPLEMENTING THIS METHOD

The invention relates to a method of establishing a data link between a first terminal, which is capable of communicating in accordance with a number of different data communication standards, and a plurality of further terminals which are each capable of communicating in accordance with a single data communication standard.

For the purpose of data communication between a pair of terminals integrated in an ISDN system (Integrated Services Digital Network) a large number of different standards, such as for example V110, X30 and ECMA102 have been known to date. There are also terminals which still operate with data communication standards that are the predecessors of the present standards. Also the present standards are constantly modified so that incompatibility may develop in many different ways amongst the methods used to communicate between terminals. Even if two terminals operate in accordance with the same version of the same standard, they can still be incompatible, because for example the one terminal use a specific option defined within the standard, such as flow control or network independent clocking in ECMA102 or V110, while the other terminal does not use this option.

There are ISDN terminals which are capable of operating according to different data communication standards by reprogramming. There are also ISDN terminals which operate according to a first data communication standard for links inside their own systems and, when an external link is to be established, are reprogrammed so as to operate according to a different data communication standard; but this reprogramming is a time-consuming operation requiring programming skill from the user.

It is an object of the invention to provide a method according to which a programmable terminal is capable of communicating with a plurality of terminals operating according to different data communication standards, without the user needing to carry out a labour-intensive reprogramming of his own terminal.

The method according to the invention is characterized in that, in the first terminal, indicators are attributed to the telephone numbers of at least a group of further terminals, these indicators showing according to what data communication standard a specific further terminal is operating, and in that the first terminal is automatically reprogrammed so as to operate according to the data communication standard of the further terminal if such an indicator is found with the telephone number, when a link to a further terminal is established.

According to another aspect of the invention, if the first terminal is called by a terminal whose telephone number and associated indicator are known to the first terminal, whilst the calling terminal or the calling exchange also transmits its own telephone number with the call, the first terminal is automatically reprogrammed in accordance with the indicator associated to the received telephone number, so as to enable communication with the calling terminal.

This is specifically advantageous in a case when an older type of terminal, which may be an internal or an external terminal, calls a more recent reprogrammable type.

With the invention it is assumed that if the reprogrammable terminal is the called terminal, the user of this terminal will know according to which data communication standard the called terminal is operating, because it is needless to observe that it is impossible to enter the right indicator with respect to the data communication standard to be implemented to be called profile indicator hereinafter, as an extension to the telephone number of this terminal. Once this profile indicator has been entered, the same or subsequent users need no longer know which data communication standard this specific terminal uses, because this information will then already be known in the calling terminal itself. For the further aspect of the invention it is likewise assumed that a calling terminal, or the exchange to which this terminal is coupled, as is customary with ISDN, transmits, to the called terminal identification, data from which at least the dial number of this terminal can be derived.

The invention likewise provides a terminal, and more specifically a telephone set, which is suitable for implementing the said method, this terminal including a reprogrammable control unit for enabling the terminal to operate according to a number of different data communication standards and a memory for storing the telephone numbers of a plurality of further terminals, this memory including memory locations for storing indicators as extensions to at least a group of telephone numbers and a table in which the data for reprogramming the control unit which belong to each indicator are stored.

Figure 2:
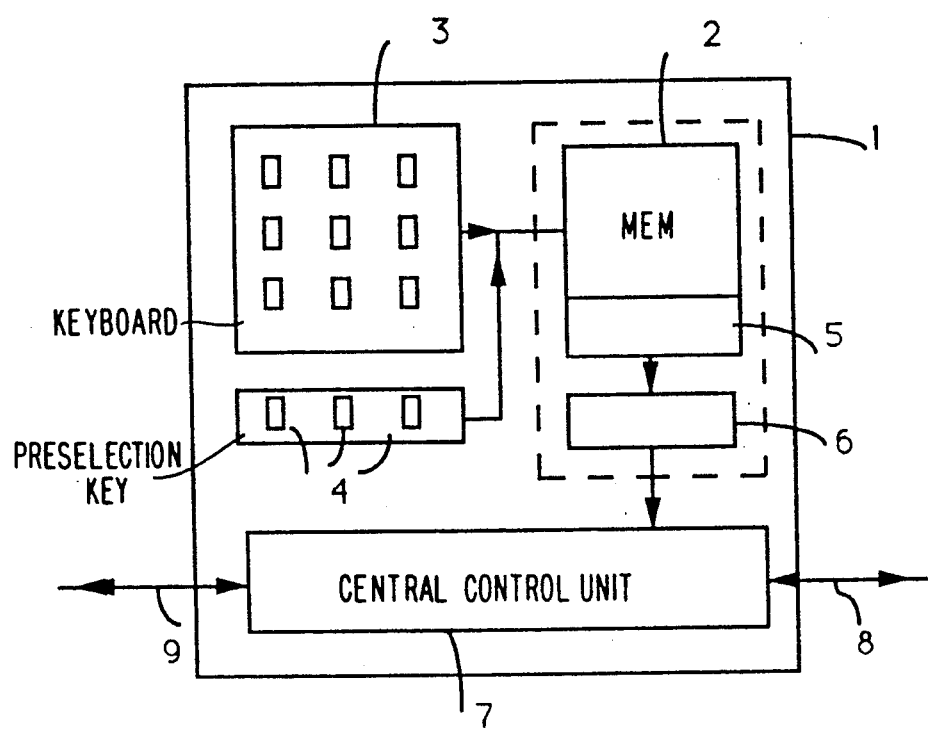

The invention will now be further explained with reference to the drawing Figures in which:

FIG. 1 shows a flow chart explaining the course of the data communication with a terminal according to the invention; and FIG. 2 shows a block diagram of a terminal according to the invention.

In the block diagram of FIG. 1 the blocks have the following meanings:

| Block number | Legends | Description |
| --- | --- | --- |
| 2 | INC. CALL? | Check whether it is a matter of an incoming call or an outgoing call |
| 3 | SELECT | Select the telephone number of the called subscriber by means of a preselection key or figure keys. |
| 4 | PROFILE? | Check whether a profile indicator is stored with the selected telephone number |
| 5 | SEARCH PAR. | Search the table for the terminal parameters belonging to this profile indicator |
| 6 | FOUND? | Check whether the terminal parameters are found |
| 7 | REPROGRAM | Automatic reprogramming of the terminal |
| 8 | CONNECTION | Establish the selected link |
| 9 | DATA EXCH. | Data exchange is taking place |
| 10 | CLEAR | Reprogramming is cancelled and the original terminal parameters are entered again |
| 12 | DNR. REC? | Check whether a telephone number is received from the calling subscriber |
| 13 | SEARCH DNR | Search the memory of the called terminal for this telephone number |
| 14 | FOUND? | Check whether this telephone number is found |

| Block number | Legends | Description |
| --- | --- | --- |
| 15 | PROFILE? | Check whether a profile indicator is stored with the found telephone number |

When the terminal is activated there is a first check to find whether it is a matter of an incoming or an outgoing call (block 2). In the case of an outgoing call the telephone number of the desired subscriber is to be selected by means of either the figure keys, or a preselection key (block 3) previously reserved for this number. Subsequently, in the memory of the terminal it is checked whether a profile indicator is stored together with the telephone number (block 4). If this is the case, a table available in the terminal memory is searched for reprogramming parameters belonging to this profile indicator (block 5) and if they are found indeed, the terminal is reprogrammed in accordance with these parameters (block 7). Then, the link with the selected subscriber is established and the data are exchanged (blocks 8 and 9), which can now be effected without any problem, since owing to the reprogramming of the calling terminal the required compatibility is provided. After the exchange of data has taken place, the programming of the terminal is returned to the original mode, that is to say, the normal programming for data communication of the terminal (block 10). If no profile indicator is found with a selected telephone number, or if there is a profile indicator indeed but no reprogramming parameters are found, the data communication link is established in the usual mode of the terminal, because it can then be assumed that the called terminal also operates in this mode.

If in block 2 it is established that an incoming call is concerned, there is a first check whether a telephone number (DNR) has been received together with this call (block 12). If a telephone number has been received, the called terminal subsequently searches its memory to find whether this telephone number is stored there (block 13) and if this number is found, it is checked whether a profile indicator is stored together with the telephone number. If also this profile indicator is found, the data link will be established in a similar way as described hereinbefore with reference to the blocks 5 to 11.

If no telephone number of the called terminal is received or if this telephone number is unknown to the called terminal, or if the telephone number is known but no profile indicator has been assigned to it, the link will be established thenceforth without the need of reprogramming, to check whether the data communication standards of the two terminals are compatible.

FIG. 2 shows a block diagram of a terminal, which will usually be a telephone set, which is capable of operating in accordance with the method according to the invention. The terminal 1 comprises a telephone number memory 2, which can be addressed by means of the figure keyboard 3 of the terminal, or by means of a preselection key 4 programmed for a specific telephone number. The telephone number memory 2 includes a memory 5 for any profile indicators associated to telephone numbers. If a profile indicator is associated to a received telephone number, this profile indicator can address a table 6, in which table reprogramming parameters for each profile indicator are stored. These reprogramming parameters can provide the reprogramming of the terminal in a central control unit 7, so that the terminal is capable of operating in accordance with a different data communication standard. The central control unit 7 provides that the data to be transferred via a data line 8 or received via a data line 9 are processed according to the standard belonging to the other terminal in order to be able to exchange them without any problems with regard to compatibility.

We claim:

1. A method for establishing a data link between a first terminal which is capable of communicating in accordance with a number of different communication standards and a plurality of respective further terminals which are each capable of communicating in a single respective data communication standard, comprising the steps of
    (a) maintaining, in the first terminal, a respective indicator along with respective telephone numbers of each of a group of the respective further terminals, each respective indicator showing what data communication standard the respective further terminal uses;
    (b) establishing a link from the first terminal to one of the further terminals;
    (c) verifying whether a respective indicator has been maintained with the respective telephone number of the one terminal; and
    (d) if a result of the verifying step is positive, automatically reprogramming the first terminal to operate according to a respective communication standard shown by the respective indicator for the one terminal.

2. The method of claim 1 wherein said establishing step comprises initiating an outgoing call from the first terminal to a second terminal.

3. The method of claim 1 wherein
    (a) said establishing step comprises receiving, in the first terminal, an incoming call from a second terminal, for which second terminal a respective telephone number and a respective indicator are maintained in the first terminal;
    (b) the method further comprises the step of transmitting from the second terminal to the first terminal, as part of the incoming call, the respective telephone number of the second terminal; and
    (c) said automatically reprogramming step is according to the respective indicator maintained for the second terminal in response to receipt in the first terminal of the respective telephone number of the second terminal.

4. The method of claim 3 further comprising the step of programming said first terminal to communicate according to a fixed data communication standard after said incoming call is terminated.

5. The method of claim 1 further comprising the step of programming said first terminal to communicate according to a fixed data communication standard after said link is terminated.

6. The method of claim 1 wherein the first terminal is a telephone.

7. Terminal for establishing a data link with a plurality of respective further terminals which are each capable of communicating in a single respective data communication standard, the terminal comprising:
    (a) a reprogrammable control unit for enabling the terminal to operate according to a number of different communication standards; and (b) a memory for storing respective telephone numbers of the respective further terminals, the memory including locations for storing respective indicators for each of a group of the respective further terminals along with the respective telephone numbers of each of the group, the memory also including a table representing parameters corresponding to the indicators for reprogramming the control unit.

8. The terminal of claim 7 further comprising means for recognizing a telephone number of one of the group of further terminals in an incoming call and for associating the respective indicator for that one with the incoming call.

9. The terminal of claim 7 further comprising means for programming the control unit to operate according to a fixed data communication standard when the data link is terminated.

10. The terminal of claim 7, wherein the terminal is a telephone.

* * * * *